(12) United States Patent
Matthys

(10) Patent No.: US 7,980,639 B2
(45) Date of Patent: Jul. 19, 2011

(54) DEBRIS GUARD FOR TRACK ROLLER FRAME AND MACHINE USING SAME

(75) Inventor: Hector M. Matthys, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 41 days.

(21) Appl. No.: 12/069,542

(22) Filed: Feb. 11, 2008

(65) Prior Publication Data
US 2009/0200859 A1 Aug. 13, 2009

(51) Int. Cl.
*B62D 55/088* (2006.01)
*B62D 55/30* (2006.01)
(52) U.S. Cl. .................... 305/109; 305/107; 305/143
(58) Field of Classification Search .................. 305/100, 305/107, 108, 109, 115, 143; 280/156, 157, 280/160, 855
See application file for complete search history.

(56) References Cited

U.S. PATENT DOCUMENTS

| | | | | |
|---|---|---|---|---|
| 1,741,878 A * | 12/1929 | Rasmussen | ..................... | 305/109 |
| 1,950,748 A * | 3/1934 | Rimple | ............................ | 305/47 |
| 1,992,702 A * | 2/1935 | Koop | ............................... | 305/109 |
| 2,022,079 A * | 11/1935 | Eberhard | ........................ | 305/152 |
| 2,049,643 A * | 8/1936 | Eberhard | ........................ | 180/9.6 |
| 3,332,725 A * | 7/1967 | Reinsma | ......................... | 305/153 |
| 3,409,335 A * | 11/1968 | Piepho et al. | .................. | 305/146 |
| 3,861,762 A * | 1/1975 | Freedy et al. | ................. | 305/100 |
| 3,901,563 A * | 8/1975 | Day | ................................ | 305/146 |
| 3,953,085 A * | 4/1976 | Randour | ......................... | 305/130 |
| 4,738,494 A * | 4/1988 | Bedis | ............................. | 305/138 |
| 4,763,961 A * | 8/1988 | Parrott | ............................ | 305/109 |
| 6,267,458 B1 * | 7/2001 | Hansen et al. | ................. | 305/107 |
| 6,371,578 B1 * | 4/2002 | Ferguson | ........................ | 305/107 |
| 6,702,406 B2 * | 3/2004 | Yoshida et al. | ................ | 305/100 |
| 6,973,194 B2 * | 12/2005 | Iwasa et al. | ..................... | 381/412 |

FOREIGN PATENT DOCUMENTS

| | | | |
|---|---|---|---|
| JP | 2002053085 A | * | 2/2002 |
| JP | 2005088639 A | * | 4/2005 |
| JP | 2007283835 A | * | 11/2007 |

OTHER PUBLICATIONS

Machine Translation of JP 2002053085A.*
Machine Transation of JP 2007283835A.*
Machine Translation of JP 2005088639A.*
Publisher unknown; Author unknown; Photo of 1928 Model Twenty Tractor; 1 page; Date unknown; Place of Publicationi unknown.
Publisher unknown; Author unknown; 1977 D4E Tractor; Date unknown; Place of Publicationi unknown.
Publisher unknown; Author unknown; 1977 D6D Tractor; 1 page; Date unknown; Place of Publicationi unknown.

(Continued)

*Primary Examiner* — Kip Kotter

(57) ABSTRACT

A tracked machine may be equipped with a debris guard in order to inhibit entry of debris from an exterior to an interior of a track roller frame. An idler, track roller frame, track and debris guard may be configured to create a difficult to traverse serpentine debris entry pathway into the track roller frame. This may be accomplished by flanking opposite sides of a track chain with a pair of guard plates, and further inhibiting debris entry by including an in board guard shield that defines a slot that surrounds a portion of the idler.

8 Claims, 3 Drawing Sheets

OTHER PUBLICATIONS

Publisher unknown; Author unknown; 1974 D8K Tractor; 1 page; Date unknown; Place of Publicationi unknown.

Publisher unknown; Author unknown; D4C/G Tractor; 1 page; Date unknown; Place of Publicationi unknown.

Publisher unknown; Author unknown; 963B/C Loader; 1 page; Date unknown; Place of Publicationi unknown.

Publisher unknown; Author unknown; D8R/T Hardbottom Tractor; Date unknown; Place of Publicationi unknown.

Publisher unknown; Author unknown; Komatsu D75 Loader; Date unknown; Place of Publicationi unknown.

Publisher unknown; Author unknown; Case 750 K Tractor; Date unknown; Place of Publicationi unknown.

Publisher unknown; Author unknown; Komatsu D355 Tractor; 1 page; Date unknown; Place of Publicationi unknown.

Publisher unknown; Author unknown; John Deere 750B Tractor; Date unknown; Place of Publicationi unknown.

* cited by examiner

DEBRIS GUARD FOR TRACK ROLLER FRAME AND MACHINE USING SAME

TECHNICAL FIELD

The present disclosure relates generally to debris guards for tracked machines, and more particularly to a debris guard for inhibiting entry of debris from an exterior to an interior of a track roller frame.

BACKGROUND

Track type tractors are one type of machine that utilize an idler recoil system in order to better allow the tracks of the machine to interact with variable loads encountered when the machine is being maneuvered over the ground. A typical track system may include a forward idler that is supported in a track roller frame assembly about which the track is mounted. The track typically includes a series of shoes that contact the ground on one side, and an inner track chain that is driven to rotate to propel the machine in a travel direction. The idler may typically be supported by a yoke that may slide fore and aft within the track roller frame in order to react to various loads that are transmitted from the track to the idler. The yoke in turn acts upon a spring that is compressed when the idler and yoke are pushed into the track roller frame assembly. The spring then recoils back on the yoke and the idler to return both toward their undisturbed operating configuration.

Because tracked machines often work in extremely hostile environments that may include mud, sand, rocks, soil and a wide variety of other debris, there is often a risk of debris entering the track roller frame and eventually undermining operation of the recoil system and/or otherwise damaging the machine. Free flowing debris generally enters the lower moving undercarriage of a tracked machine at the track frame ends when the machine is turning, or between the track rollers due to a sloped surface operation. In one specific example, long exposure to mud can become caked or bricked inside the track roller frame inhibiting the ability of the recoil system to respond to various loads on the track, undermining machine operation and potentially leading to failure. In another example, rocks digested into the track roller frame may lead to fracture or breakage of track components, idlers, rollers and a variety of other components associated with the recoil system. Debris can often build up on the top of a track roller frame by either being carried to the top side of the track shoes and dropped onto the track roller frame top, or by being deposited on top of the track roller frame from track frames submerged in debris.

Over the years, engineers have devised a long list of guarding strategies intended to inhibit digestion of debris into the track roller frame of a tracked machine. In fact, guarding strategies date as far back as 1928, where the model Twenty Caterpillar track type tractor included guarding surfaces and skirting intended to inhibit the digestion of debris into its track roller frame assembly. From that time forward, virtually every manufacturer of tracked machines has included some guarding strategy to inhibit digestion of debris into their respective track roller frames. Many of these guard designs are particular to the specific track structure and other machine geometry features that are not easily transferable to different designs. Thus, a guarding strategy for one machine may be totally ineffective and inappropriate for a different machine design. With every new design, new guarding strategies must be devised in order to specifically address the needs and geometry of each new design.

The present disclosure is directed toward problems associated with guarding against ingestion of debris into a track roller frame.

SUMMARY OF THE DISCLOSURE

In one aspect, a debris guard assembly for a machine includes a pair of guard plates with a leading edge shaped as an arc of a circle. The pair of guard plates are separated by a distance to flank a track chain. An inboard shield is attached between the plates and defines an idler slot sized for receiving an idler about a same diameter as the circle.

In another aspect, a machine includes a pair of idler axle blocks slidably mounted in a track roller frame. An idler is rotatably supported by and between a pair of idler axle blocks. A recoil yoke is attached to the pair of idler blocks. A track that includes track chain is mounted around the track roller frame. A debris guard is attached to at least one of the pair of idler blocks and the recoil yoke. The debris guard includes an inboard shield that defines a slot that receives the idler, and pair of guard plates that flank opposites sides of a segment of the track chain in contact with the idler.

In still another aspect, a method of inhibiting debris entry into an interior of a track roller frame includes blocking debris greater than a first size by defining a first clearance slit between an outer width of a track chain and pair of guard plates. Debris greater than a second size is blocked by defining a second clearance slit between an idler and an inboard shield. The first clearance slit and the second clearance slit are arranged in series to define portions of a debris entry pathway from an exterior to an interior of the track roller frame.

DETAILED DESCRIPTION

Figure 1:
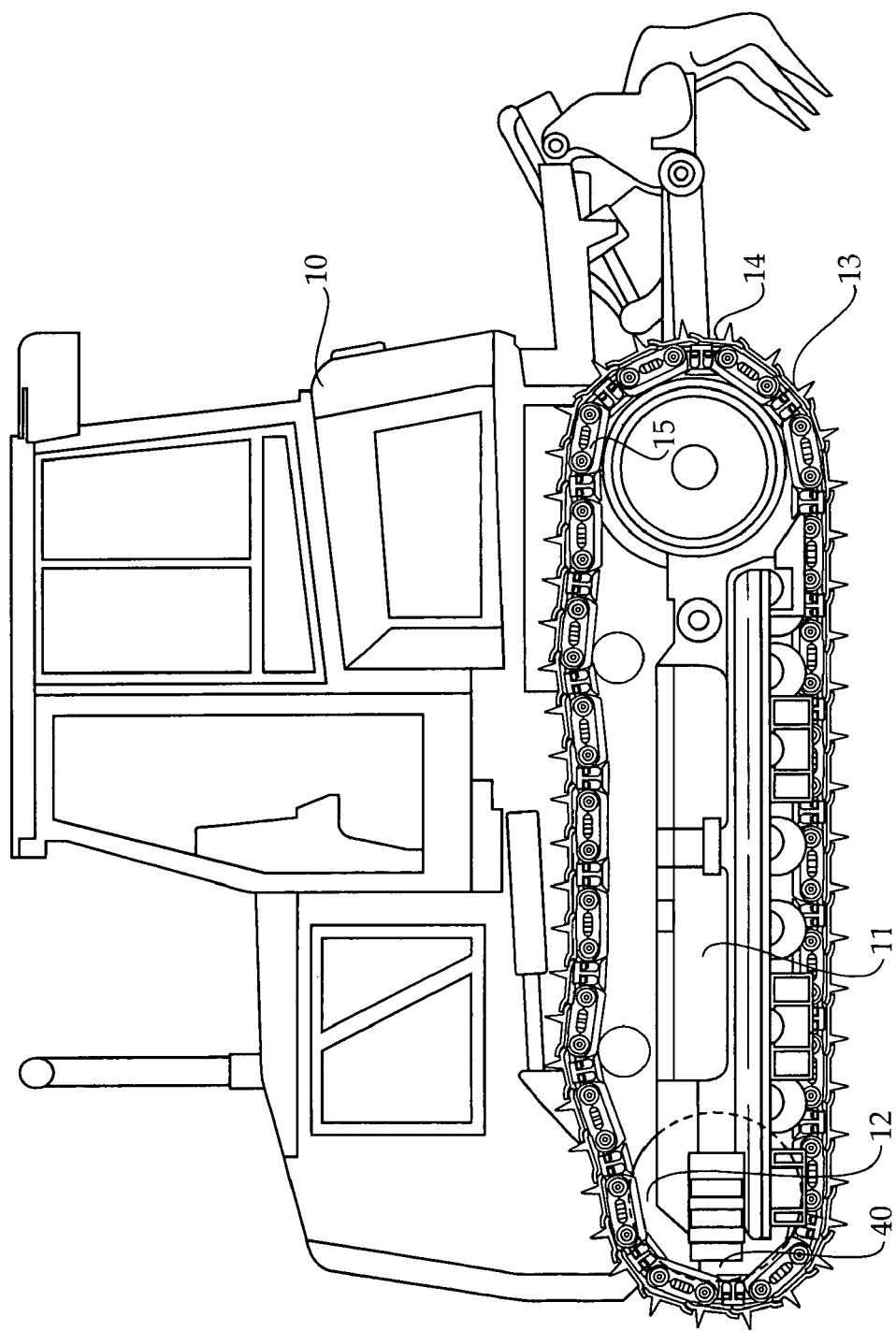
FIG. 1 is a perspective view of a machine according to one aspect of the present disclosure.

Referring to FIGS. 1-5, a machine 10 according to the present disclosure may be a track type tractor or some other machine that includes a track 13 mounted about a track roller frame 11 and idler 12. For instance, a variety of track type machines, including but not limited to excavators, loaders and landfill equipment, as well as others, are within the contemplated scope of the present disclosure. Machine 10 includes a variety of features including a debris guard 40 to inhibit entry of debris into track roller frame 11, which could undermine a recoil system (not shown) or damage other aspects of machine 10, such as produce excessive wear or breakage of a variety of track roller frame related components.

Figure 4:
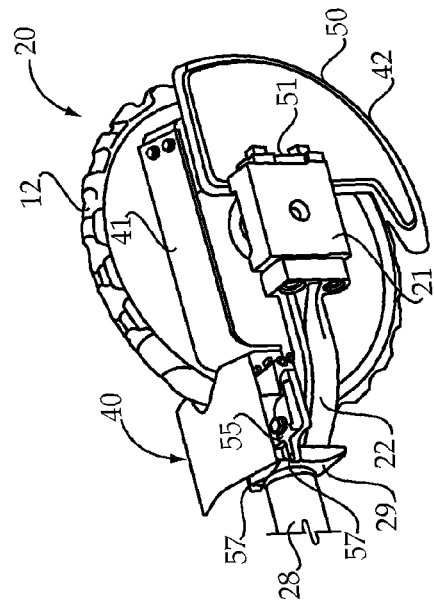
FIG. 4 is a perspective view of a preassembled unit according to another aspect of the present disclosure.
Figure 2:
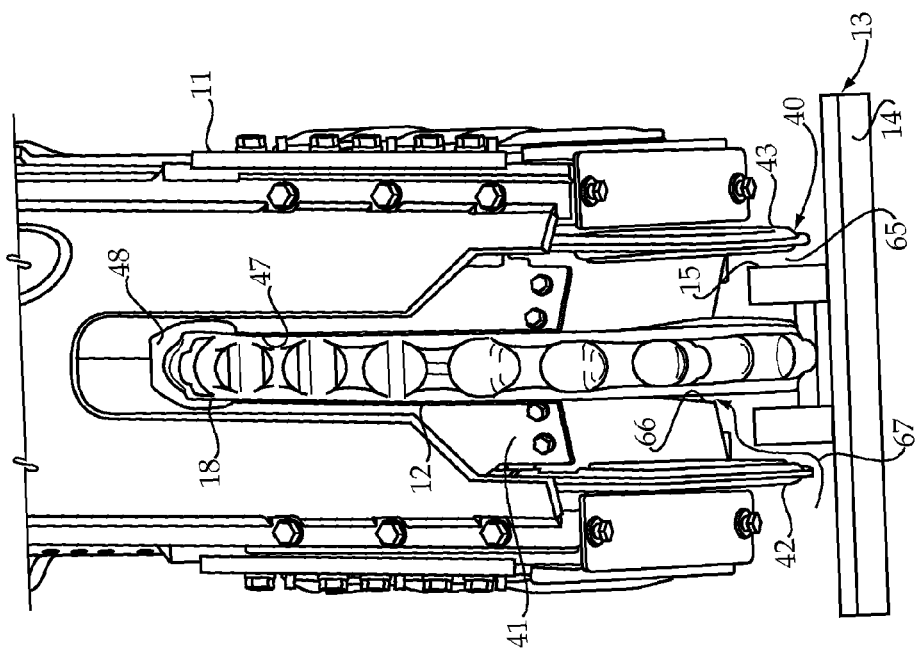
FIG. 2 is a diagrammatic view of a track roller frame, idler, debris guard and track according to another aspect of the present disclosure.
Figure 5:
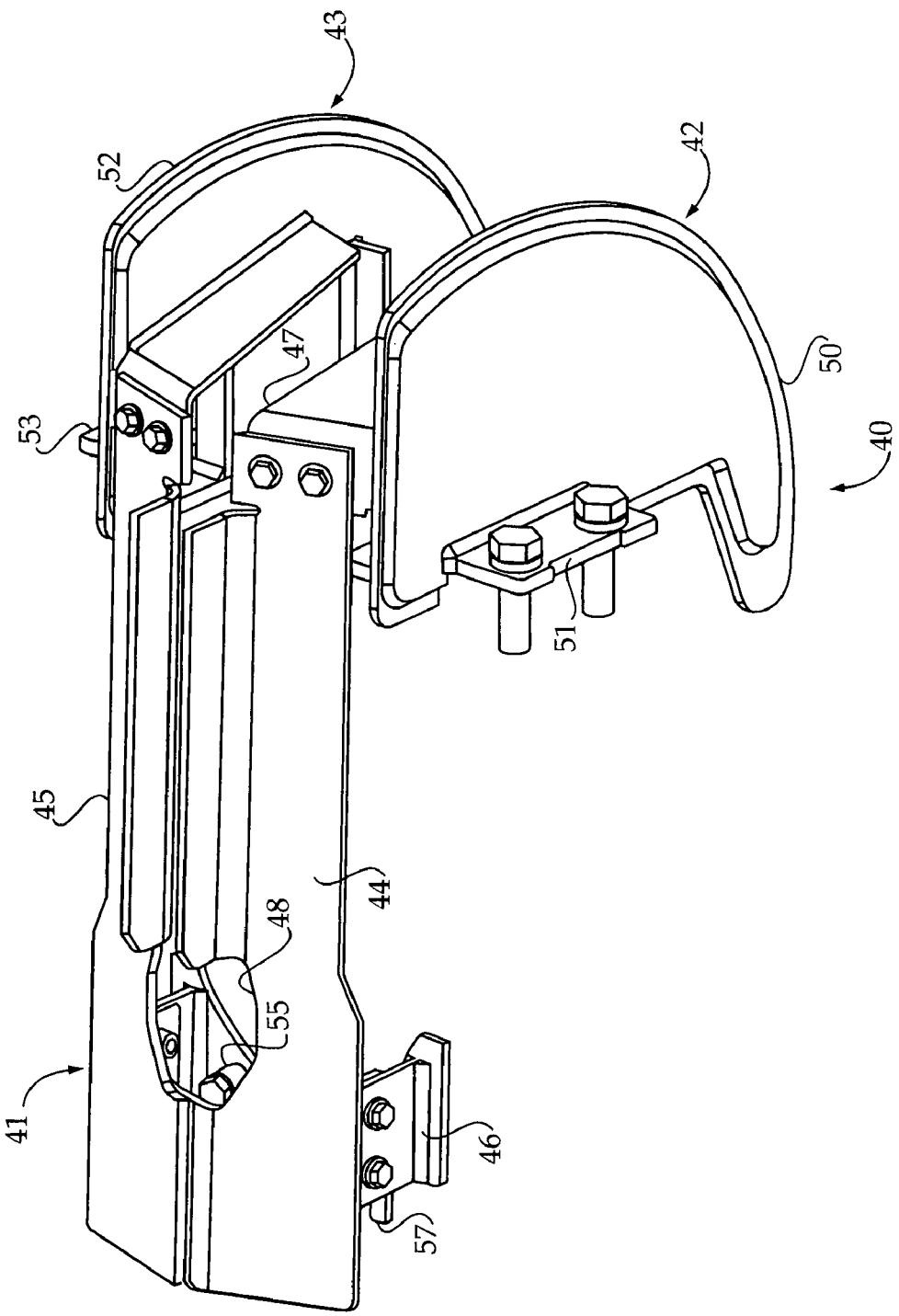
FIG. 5 is a perspective view of a debris guard assembly according to another aspect of the present disclosure.

Referring specifically to FIG. 5, a debris guard assembly 40 according to the present disclosure may include a pair of guard plates 42 and 43 that are attached on opposite sides of an inboard shield 41. Guard plates 42 and 43 each include a respective leading edge 50 and 52 that is shaped as an arc of a circle. The pair of guard plates 42 and 43 may be separated by a distance to flank opposite sides of a track chain 15, such that the track chain 15 is received between the pair of guard plates 42 and 43, as best shown in FIG. 2. This provides a first line of defense by the track chain 15 and the respective guard plates 42 and 43 defining a first clearance slit 65, also as best shown in FIG. 2. In order to provide an adequate thickness to guard plates 42 and 43 without excessive weight, each guard plate may be a composite of thinner plates welded at their periphery with the inner most plate being hollow. Each of the guide plates 42 and 43 may also include a mounting feature, such as an idler axle block mount 51 and 53 as best shown in FIGS. 4 and 5. This aspect of the disclosure allows for the guard plates 42 and 43 to move with the idler as it undergoes recoiling events during normal operation to maintain the geometry of clearance slit 65, even during dynamic movements. The guide plates 42 and 43 may be attached to the inboard shield 41 in any suitable manner such as via a weld seam along an inner surface of the respective guide plates 42 and 43.

Inboard shield 41 includes a top right guard 44, a top left guard 45 and a rear guard 46 as best shown in FIG. 5. Inboard shield 41 defines a slot 47 that surrounds and receives a portion of idler 12 as best shown in FIG. 2. In addition, slot 47 terminates in an enlarged opening 48 sized to received a rim 18 of the idler 12. As best shown in FIG. 5 (see location of numeral 47) and as shown in FIG. 2, a segment of idler slot 47 is located between, but separated from, the guard plates 42 and 43. Together, inboard shield 41 and idler 12 define a second clearance slit 66 that provides a second line of defense against debris entry into the interior of track roller frame 11. Together, slits 65 and 66 form portions of a serpentine shaped debris entry pathway 67 extending between an exterior and an interior of the track roller frame 11. Like guard plates 42 and 43, the inboard shield 41 includes a mount, in particular, a yoke mount 55 that results in the inboard shield also moving with idler 12 during dynamic recoil events to maintain the geometry of clearance slit 66 throughout operation of machine 10. Although debris guard assembly 40 includes block mounts 51 and 53 as well as a yoke mount 55, those skilled in the art will appreciate that other attachment strategies could be substituted while remaining within the intended scope of the present disclosure. As best shown in FIG. 4, the debris guard 40 may include an orientation alignment feature 57 that interacts with an end 29 of a recoil shaft 28 to prevent the recoil shaft 28 from rotating about its axis. Nevertheless, this feature may be eliminated in the favor of an alternative strategy for inhibiting rotation of shaft 28, if desired. This aspect of the disclosure is best shown in FIG. 4.

Figure 3:
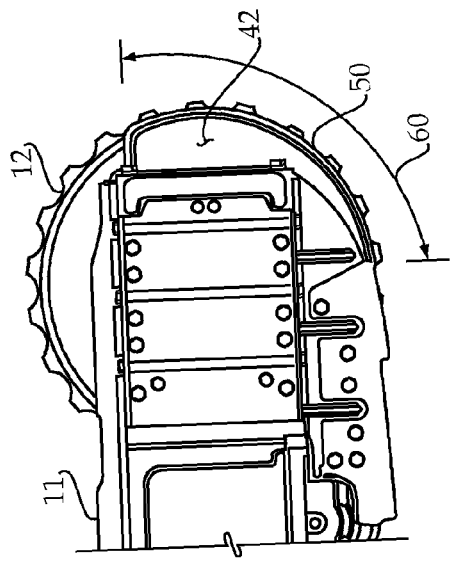
FIG. 3 is a side view of a track roller frame and idler equipped with a debris guard according to the present disclosure.

Referring specifically to FIG. 3, the leading edges 50 and 52 of the guard plates 42 and 43 are shaped as an arc of a circle which spans about one quadrant 60. Nevertheless, those skilled in the art will appreciate that the arcuate span may be selected to suit the particular geometry of any given application. The diameter of the circle corresponding to the leading edges 50 and 52 of guard plates 42 and 43 is about the same as the base diameter of idler 12 so that the leading edges 50 and 52 remain about the same distance away from the underside of shoes 14 as the face of the individual teeth (if any) of idler 12. In this way, as wear occurs during normal operation of machine 10, indexing on the idler 12 and wear to track chain 15 can reduce the separation distance between both the rim 18 of idler 12 as well as the leading edges 50 and 52 with respect to the shoes 14. In other words, providing that wear is not so severe that idler remains out of contact with shoes 14, the guard plates 42 and 43 will also remain out of contact with shoes 14 during normal intervals of wear that periodically require a belt tensioning adjustment in a known manner.

Although not necessary, guard plates 42 and 43 may be parallel to one another and perpendicular to an axis of rotation of idler 12. Nevertheless, alternative geometry's, such as an inward slant would also fall within the intended scope of the present disclosure. Although not necessary, the present disclosure contemplates a preassembled unit strategy that better facilitates the debris guard features by allowing them to be assembled as shown in FIG. 4 prior to installation in track roller frame 11. In particular, a preassembled unit 20 may include idler 12, a pair of idler axle blocks 21, a yoke 22 and debris guard 40 all preassembled as a unit. This preassembled unit is then installed in track roller frame 11 by sliding the idler axle blocks 21 between wear plates until yoke 22 abuts end 29 of recoil shaft 28. At the same time, the orientation alignment feature 57 engages the outer edges of end 29 of recoil shaft 28 to prevent it from rotating.

Those skilled in the art will appreciate that sizing of slot 47 verses the thickness of idler 12 may be selected to shape clearance slit 66 to prevent entry of debris having a size greater than the width of the slit. Likewise, the thickness and spacing of guard plates 42 and 43 along with the width track chain 15 may be selected to prevent entry of debris of size that is different or the same as the width of clearance slit 65. Although not necessary, the clearance slit 65 may be chosen to be slightly larger than the inner clearance slit 66 due to the fact that more movement in track 13 is generally allowed for normal operation, and larger clearance 65 can prevent contact between guard plates 42 and 43 while preventing a bulk of potential debris from gaining entry into debris pathway 67. By arranging clearance slits 65 and 66 in series, and by appropriately sizing the same, the serpentine entry pathway 67 can inhibit entry of most undesirable debris without substantially affecting performance of machine 10 generally, or the track system specifically.

INDUSTRIAL APPLICABILITY

The present disclosure finds potential application to any tracked machine in which their is a desire to inhibit debris from entering a track roller frame that rotationally supports an idler about which a track is mounted. The present disclosure find particular application in track systems that include an idler that is received into the track chain rather than riding on an outer surface of a track chain as in many prior art systems. This strategy allows the debris guard of the present disclosure to interact with the track chain and idler to define a serpentine debris pathway that includes at least two clearance slits in series to present a layered line of defense against entry of undesirable debris into the interior of a track roller frame. The present disclosure finds specific applicability to track type tractors and like machines that operate in hostile environments, including but not limited to mud, rocks, sand and a variety of other debris that could potentially undermine a recoil system or another machine feature if becoming lodged in an undesirable location.

The debris guard strategy of the present disclosure also has the advantage of moving with the idler during dynamic recoil events to maintain the geometry of the clearance slits to inhibit ingestion of debris even when the idler is recoiling and moving with regard to other components of machine 10. By including an arc shape on the guard plates of the debris guard with a diameter about the same as the idler, and with the spacing as taught above, the clearance slit geometry also is maintained during normal wear of the track system. In particular, as the idler becomes more indexed and the track chain 15 wears, the idler rim 18 will tend to ride closer to the underside of the track shoes 14. As long as this wear does not become excessive, the guard plates 42 and 43 will also remain out of contact with the underside of shoes 14 during normal wear cycles.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine comprising:
    a track roller frame;
    a pair of idler axe blocks slidably mounted in the track roller frame;
    an idler ratatably supported by and between the pair of idler axle blocks;
    a recoil yoke attached to the pair of idler blocks;
    a track that includes a track chain mounted around the track roller frame;
    a debris guard attached to at least one of the pair of idler blocks and the recoil yoke, and including an inboard shield that defines a slot that receives the idler, and including a pair of guard plates that flank opposite sides of a segment of the track chain in contact with the idler such that the track chain is received between the pair of guard plates;
    a segment of the slot being located between, but separated from, the pair of guard plates;
    wherein the debris guard moves with the idler relative to the track roller frame during a responsive dynamic recoil events;
    wherein each of the pair of guard plates and a side of the segment of the track chain define a first clearance slit;
    the inboard shield and the idler define a second clearance slit; and
    the first clearance slit and the second clearance slit being in series with regard to a debris entry pathway from an exterior to an interior of the track roller frame.

2. The machine of claim 1 wherein the pair of guard plates are perpendicular to an axis of rotation of the idler.

3. The machine of claim 1 wherein each of the guard plates has a leading edge shaped as an arc of a circle; and the circle has a diameter about the same as a diameter of the idler.

4. The machine of claim 3 wherein the arc spans about one quadrant.

5. The machine of claim 1 wherein the track, the debris guard and the idler define a serpentine debris entry pathway from an exterior to an interior of the track roller frame.

6. The machine of claim 1 wherein the idler, the pair of idler axle blocks, the recoil yoke and the debris guard are attached together as a preassembled unit.

7. The machine of claim 1 wherein each of the guard plates has a leading edge shaped as an arc of a circle with a diameter about the same as a diameter as the idler;
    the circle spans about one quadrant; and
    the track, the debris guard and the idler define a serpentine debris entry pathway from an exterior to an interior of the track roller frame.

8. A machine comprising:
    a track roller frame;
    a pair of idler axle blocks slidably mounted in the track roller frame;
    an idler rotatably supported by and between the pair of idler axle blocks;
    a recoil yoke attached to the pair of idler blocks;
    a track that includes a track chain mounted around the track roller frame;
    a debris guard attached to at least one of the pair of idler blocks and the recoil yoke, and including an inboard shield that defines a slot that receives the idler, and including a pair of guard plates that flank opposite sides of a segment of the track chain in contact with the idler such that the track chain is received between the pair of guard plates;
    a segment of the slot being located between, but separated from, the pair of guard plates;
    wherein the debris guard moves with the idler relative to the track roller frame during a responsive dynamic recoil events;
    a recoil shaft abutting the recoil yoke; and
    the debris guard includes a recoil shaft orientation alignment feature in contact with the recoil shaft.

* * * * *